Jan. 13, 1925. 1,523,079
E. H. PEABODY
COUPLING
Filed March 15, 1922 2 Sheets-Sheet 2
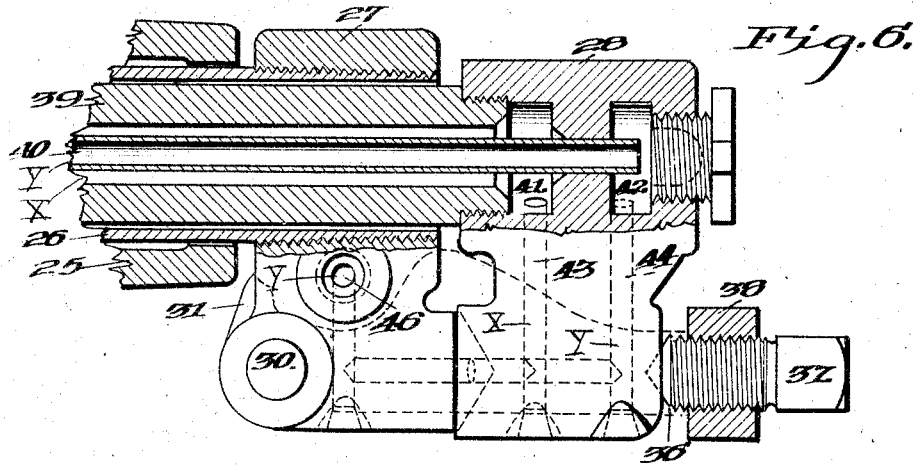
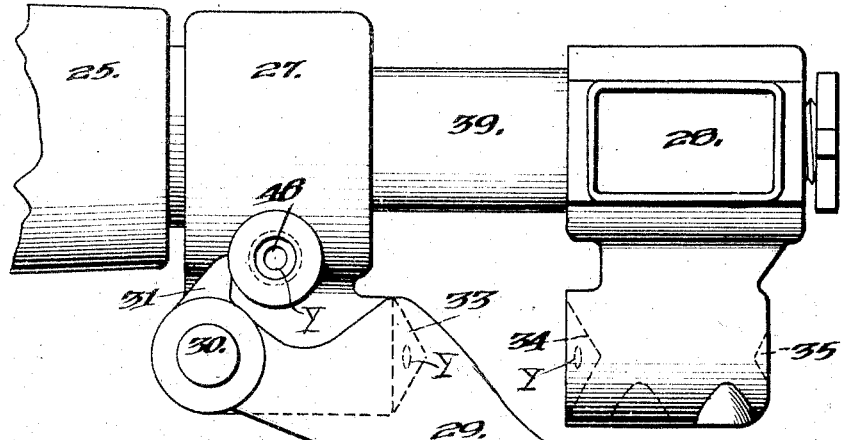
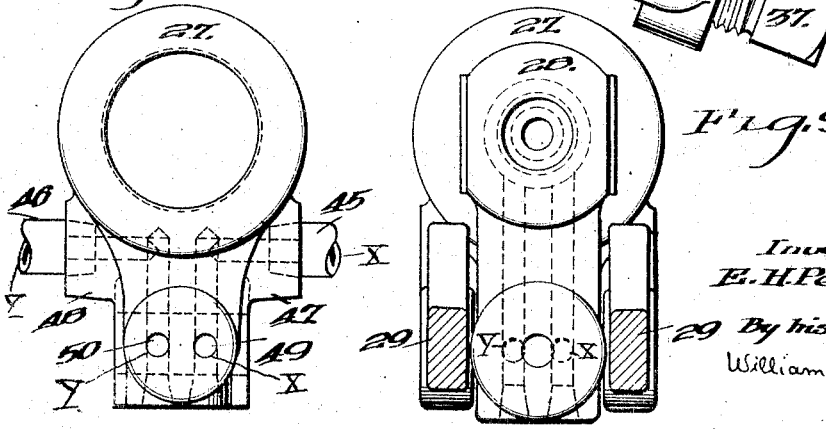
Inventor
E. H. Peabody
By his Attorney
William R. Pratt.

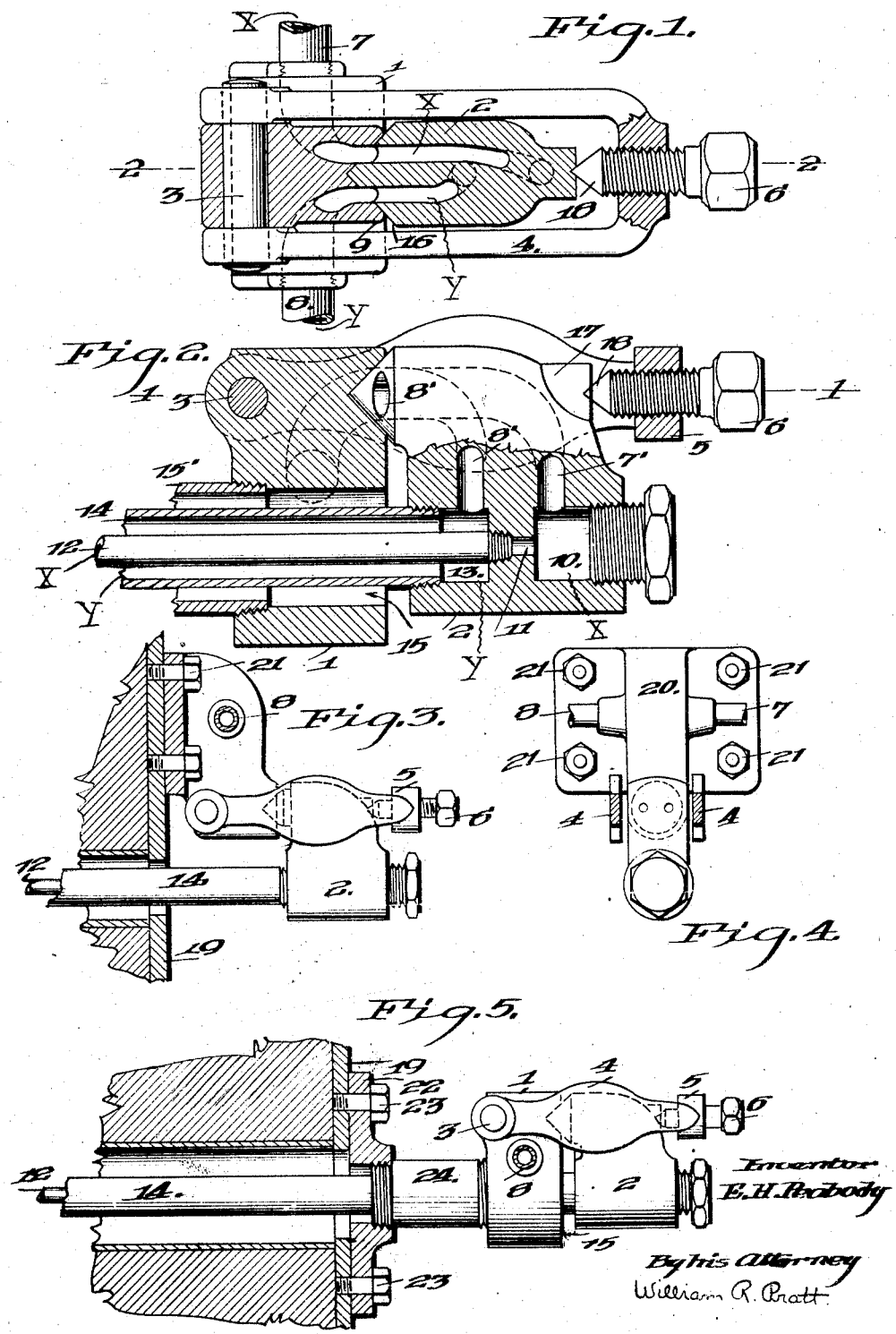

Patented Jan. 13, 1925.

1,523,079

UNITED STATES PATENT OFFICE.

ERNEST H. PEABODY, OF PELHAM MANOR, NEW YORK.

COUPLING.

Application filed March 15, 1922. Serial No. 543,841.

*To all whom it may concern:*

Be it known that I, ERNEST H. PEABODY, a citizen of the United States, residing at Pelham Manor, in the county of Westchester and State of New York, have invented certain new and useful Improvements in Couplings, of which the following is a specification.

My invention relates to a pipe coupling for pipes having a plurality of separate passages, and particularly for those connecting an oil burner atomizer to the source of supply.

An object of my invention is to provide a quick detachable coupling between an atomizer and its supply means which will insure the connection of a plurality of passages in the atomizer with the corresponding passages in the supply means.

Another object of my invention is to provide such a coupling that will be simple in construction but very efficient in operation, and in which a single clamping member provides the connection between the two parts.

Another object of my invention is to provide a coupling in which the engaging portions of both members will be protected when the parts are coupled and in which one part will be protected when the detachable member of the coupling is removed.

Other objects will be apparent from the following detailed description and the appended claims.

Figure 1 is a section on the line 1—1 of Figure 2 through a device having an oil supply pipe and a concentric air or steam supply pipe. It is optional whether the inner or outer pipe be used for oil—the other pipe being used for the atomizing medium.

Figure 2 is a section on the line 2—2 of Figure 1.

Figure 3 is a section of a furnace wall showing one means of attachment of the device to a furnace.

Figure 4 is an end view of Figure 3, with the clamping yoke in section.

Figure 5 is a view, partly in section, of another means for attaching the device to a furnace.

Figure 6 is a longitudinal sectional view of an atomizer of a type having supply and return passages.

Figure 7 is a side elevation of the same with the coupling disconnected and the atomizer partly withdrawn.

Figure 8 is an end elevation of the fixed coupling member, with parts omitted.

Figure 9 is an end view of the assembled device with parts in section.

In the form of the device shown in Figures 1 to 4 inclusive, the coupling consists of two members, one member 1 being fixed to the furnace or other support and the other member 2 being carried by the atomizer. Pivoted on a pin 3 mounted in the member 1 is a yoke 4, and through a threaded opening in the part 5 passes a set screw 6. A supply pipe 7 and a supply pipe 8 are attached to the member 1 which has passages therethrough communicating with these pipes. One passage communicates with a passage 7' and the other with a passage 8' in the member 2 of the coupling. The member 1 has a cone shaped depression 9 and the member 2 has a matching projection 16, to insure the exact registry of the proper passages when the parts are assembled.

The passage 7' leads into a chamber 10 in the member 2, which chamber communicates through a passage 11 with a pipe 12. The passage 8' leads into a chamber 13 into which screws a pipe 14. Surrounding the pipe 14 is a passage 15 in the coupling member 1 which communicates with a pipe 15' upon which the coupling member 1 is screwed. This pipe 15' is fastened in the furnace in any usual or desired manner. In the common construction the pipe 12 is an oil supply pipe and the pipe 14 a steam supply pipe, while air may if desired be drawn in through the pipe 15', but it is obvious that air under pressure may be used instead of steam, or other arrangements may be made without any modification of the coupling.

The member 2 is provided with a conical depression in a part 17 while the set screw 6 has a conical end 18 to engage the same. By this means the parts may be drawn into tight contact. It is obvious that other clamping means may be used for holding the parts 1 and 2 in tight engagement without departing from the scope of the invention.

In the supporting device shown in Figure 3, a member 20 is fastened by screw bolts 21 to a plate 19 carried by the front of the furnace. This member 20 corresponds to the member 1 and has the pipes 7 and 8 leading thereto and suitable passages therethrough. In other respects, the structure is identical with that already described.

In the arrangement shown in Figure 5, the plate 19 carried by the furnace front, has fastened thereto by screw bolts 23 a plate 22 having an opening into which is screwed a member 24. The outer end of this member 24 carries the coupling member 1 of the form shown in Figures 1 and 2. The connection therebetween is detachable and as shown is a screw threaded connection. In other respects the construction is the same as that described above.

The form of the device shown in Figures 6 to 9 inclusive is applied to what is sometimes known as the Peabody-Fisher type of atomizer in which there is an oil supply pipe and an oil return pipe, the atomization being produced entirely by the pressure upon the oil and without any steam or air under pressure.

A portion of the furnace 25 has a member 26 extending therethrough to which is fastened the coupling member 27 which corresponds to the member 1 of the first form. The other member 28 of the coupling corresponds in general form with the member 2 of the first structure. If desired the part 26 carrying with it the parts 27 and 28 and other attached parts may be made movable longitudinally in the bearing 25. On a pivot pin 30 in the lower part of the member 27 is pivoted the yoke member 29 which has a stop 31 at its rear portion to engage a corresponding stop member to prevent the yoke dropping entirely down.

The coupling member 27 has a conical projection 33 adapted to interfit with a similar depression 34 in the member 28, both passages opening through these members. In the front part of the member 28 is another conical depression 35 which is engaged by the pointed end 36 of the set screw 37 that passes through the yoke portion 38.

The oil enters through a supply pipe 45, passage 49 in the member 27, passage 43 in member 28, chamber 41 and pipe 39 to the atomizer. The oil that is returned or bypassed returns through pipe 40 which is concentric with the pipe 39, chamber 42, passage 44 in member 28, passage 50 in member 27 and return pipe 46. The pipes 45 and 46 are screwed or otherwise attached to bosses or shoulders 47 and 48 on the member 27, as shown particularly in Figure 8. The shoulder 48 also acts as a stop to cooperate with the stop 31 on the yoke member to limit its downward movement. The passage of the oil from the source of supply to the atomizer has been designated by the letter X, while the path of return has been designated by the letter Y. It will be noted that these are so arranged that the proper passages will always be in communication when the parts are assembled. For example, in the position of the parts shown in Figure 7, it is obvious that the passage Y on the female member 34 must necessarily register with the passage Y in the male member 33 when the parts are brought together and the coupling fastened.

It will be noted by reference to Figures 2, 3, 4, 5, 6, 7 and 9 that the sides of the yoke are extended vertically, forming a wide face on each side of the coupling members. Also by reference to Figures 1, 4 and 9 it will be noted that there is a restricted clearance space between these extended faces of the yoke and the adjacent portion of the detachable part of the coupling member 2 in Figure 1 or 28 in Figures 6 and 7. It will be obvious, therefore, that the faces of the yoke guide the detachable part of the coupling into its correct position thus insuring correct alignment of the parts and the passages therein. In other words, it would be impossible for the passages to fail to register in the desired manner, even if the passing of the pipe 14 into the pipe 15 (Fig. 2) did not properly align the parts.

In the form of coupling shown in Figures 6, 7 and 9, the sides of the yoke extend upward on each side of the part 27 completely covering the members 33 and 34 when in the closed position shown in Figure 6. When in the open position shown in Figure 7, the sides of the yoke by their special form, and by reason of the stop 31 and abutment 48 which prevent the yoke from dropping below a fixed position, still protect the delicate surface of the male part 33 of the coupling, even when the atomizer attached to the part 28 is completely withdrawn. The female part 34 of the coupling is, by its form, self-protective from damage, but the male portion 34 which remains constantly in place on the boiler front is very liable to damage. The invention therefore includes the important feature of protection of the exposed surfaces on whose smoothness a tight connection depends.

It is obvious that it is immaterial whether the depression 9 is in member 1 and the projection 16 in member 2, or whether the opposite arrangement is employed as in Figures 6 and 7. While a set screw has been shown as the clamping means, obviously other devices may be used. While all of these interfitting parts have been illustrated as conical, they may be flat or other forms of joints can be employed. Ordinarily two passages are all that it is necessary to provide for in the coupling member, but more may be employed if desired. Furthermore, while these passages are usually eccentric, this arrangement may be varied without departing from the invention. In general it may be stated that the invention is limited only by the scope of the appended claims.

I claim as my invention:

1. A coupling consisting of two members, one of which is provided with a socket and has passages opening into the walls of the socket and the other of which is provided with a part conforming with said socket and has passages opening into the walls of said part, and means for clamping the members in assembled relation, the socket, part and clamping means cooperating to necessitate the assembly of the members in one definite relation and insure registration of corresponding passages when the socket and part are brought together.

2. A coupling consisting of two members, each provided with eccentric passages, an atomizer carried by one member and in communication with the passages therein, the other member provided with an opening through which the atomizer passes, pipes communicating with the passages in the other member, means to insure registration of the corresponding passages when the members are assembled, and means for securing the members together in fluid-tight relation.

3. A coupling consisting of two members, one of which is provided with a socket and has passages opening into the walls of the socket, and the other of which is provided with a part conforming to the socket and has passages opening into the walls of the part, an atomizer connected to one of the coupling members and communicating with the passages therein, means carried by one coupling member and coacting with the other to hold the members in assembled relation, the socket, part and clamping means cooperating to necessitate the assembly of the members in one definite relation and insure registration of corresponding passages when the socket and part are brought together.

4. A coupling comprising two members, one having eccentric passages therein opening to the exterior of the member at one end and communicating with pipes at the other end, a bore extending through said member, the second member having corresponding eccentric passages opening to the exterior thereof at one end and communicating with an atomizer at the other end, and means for securing the members together with the atomizer extending through said bore and insuring proper registration of the exteriorly opening ends of the corresponding passages.

5. A coupling comprising two members each having eccentric passages opening to the exterior thereof, pipes connected to the passages of one member, and an atomizer carried by the other member, a yoke pivotally carried by one member and having a set screw to engage the other member to clamp the members in fluid tight relation, and means which necessitate the assembly of the two members in one definite relation and insure the proper registration of corresponding passages when the parts are assembled.

6. A quick detachable coupling comprising two members each having a plurality of eccentric passages therethrough adapted to be brought into registration, a yoke pivoted on one member and having movable means to engage the other member and force the two members into fluid tight relation, and a stop for limiting the pivotal movement of the yoke, said yoke formed to guide the other member in assembly and positively insure the proper registration of corresponding passages when the parts are assembled.

7. A detachable coupling comprising two members each having eccentric passages therethrough adapted to be brought into registration, a bore through one member, an atomizer carried by the other member and adapted to pass through said bore, a clamping device carried by one member and adapted to force the two members into fluid-tight relation, and means for insuring the proper registration of corresponding passages when the parts are assembled.

8. A detachable coupling comprising two members each having a plurality of passages therethrough, each passage in one member being adapted to register with a certain passage in the other member, a bore in one member, an atomizer carried by the other member and passing through said bore, means carried by one member and engaging the other to force the two into fluid tight relation, and means for insuring correct registration of the passages when the parts are assembled.

9. A coupling comprising two members having male and female parts adapted to be brought into registration, a yoke carried by the member having the male part, said yoke having broad sides which protect the engaging parts when they are coupled together, stops carried by the yoke and its supporting member to limit the movement of the yoke to inoperative position, said stops detaining the yoke in a position where the sides thereof still protect the male part when the other member of the coupling is withdrawn.

10. A coupling comprising two members having male and female parts adapted to be brought into registration, a yoke carried by the member having the male part, said yoke having broad sides which protect the engaging parts when coupled together, and means for limiting the movement of the yoke to inoperative position so that the sides always protect the male part.

11. A coupling comprising two members having male and female parts adapted to be brought into registration, a yoke carried by one member, said yoke having broad sides which protect the engaging portions of both parts when coupled, and means for limiting the movement of the yoke to inoperative position, whereby the sides protect the male part when uncoupled and also serve to guide the detachable member into proper relation to the other when the parts are to be coupled together.

12. A detachable coupling comprising two members each having passages therethrough adapted to be brought into registration, means carried by one member for protecting the engaging portions of both members when they are coupled together, and means carried by the first-named means for clamping the members in engagement.

13. A detachable coupling comprising two members each having passages therethrough adapted to be brought into registration, means for protecting the engaging portions of both members when they are coupled, and also protecting one member when the coupling is disconnected, and means for fastening the two coupling members in engagement.

In testimony whereof I have affixed my signaure.

ERNEST H. PEABODY.